United States Patent
Paczkowski et al.

(10) Patent No.: US 9,686,164 B1
(45) Date of Patent: Jun. 20, 2017

(54) PACKET ALLOCATION SCHEMA FOR 3G AND 4G ROUTERS

(75) Inventors: Lyle Walter Paczkowski, Mission Hills, KS (US); Rodney Charles Kunkel, Overland Park, KS (US); James Earl Riehl, Overland Park, KS (US); Timothy Hugh Pearson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 368 days.

(21) Appl. No.: 13/445,512

(22) Filed: Apr. 12, 2012

(51) Int. Cl.
H04L 12/26 (2006.01)

(52) U.S. Cl.
CPC ................... H04L 43/08 (2013.01)

(58) Field of Classification Search
CPC ....................................... H04L 43/08
USPC .......................................... 370/231
See application file for complete search history.

(56) References Cited

U.S. PATENT DOCUMENTS

| 6,122,514 | A * | 9/2000 | Spaur et al. ................. 455/448 |
| 6,614,781 | B1 * | 9/2003 | Elliott ................. H04L 12/6418 370/352 |
| 6,834,044 | B2 * | 12/2004 | Sugirtharaj ............ H04W 28/20 370/328 |
| 7,710,869 | B1 * | 5/2010 | Gleichauf ............... H04L 45/00 370/229 |
| 8,428,611 | B2 * | 4/2013 | De Pasquale ....... H04L 12/5695 455/452.2 |
| 8,848,534 | B2 * | 9/2014 | Yang ..................... H04W 16/10 370/230 |
| 8,964,564 | B2 * | 2/2015 | Vasseur .................. H04L 45/02 370/237 |
| 9,007,898 | B2 * | 4/2015 | Jain ..................... H04L 41/0896 370/230 |
| 2003/0007485 | A1 * | 1/2003 | Venkitaraman ......... H04L 45/00 370/389 |
| 2003/0174688 | A1 * | 9/2003 | Ahmed et al. ................ 370/349 |
| 2005/0144298 | A1 * | 6/2005 | Samuel ..................... G06F 8/61 709/230 |
| 2005/0220093 | A1 * | 10/2005 | Chen et al. .................... 370/389 |
| 2005/0240796 | A1 * | 10/2005 | Dziong ............... H04L 12/4637 714/2 |
| 2007/0036087 | A1 * | 2/2007 | Kangru ......................... 370/252 |
| 2007/0064604 | A1 * | 3/2007 | Chen et al. ................... 370/230 |
| 2007/0124494 | A1 * | 5/2007 | Harris .......................... 709/233 |
| 2008/0002677 | A1 * | 1/2008 | Bugenhagen .......... H04L 12/14 370/356 |
| 2008/0049630 | A1 * | 2/2008 | Kozisek ............. H04L 41/0823 370/250 |

(Continued)

Primary Examiner — Guang Li (57) ABSTRACT

Methods and systems that facilitate allocating a transmission of data over multiple wireless links using an allocation server is provided. An indication of a first and second endpoint is received. An indication of a plurality of wireless links between the first and second endpoints is also received. The plurality of wireless links transmit data via an information network that includes an allocation server that monitors the packets of data transmitted via the plurality of wireless links. Such monitoring reveals whether one or more of the wireless links satisfies a threshold based on one or more of an amount of latency, jitter, and dropped packets between the first and second endpoints. Based on satisfying a threshold, one or more packets of data are allocated by the allocation server.

16 Claims, 4 Drawing Sheets

(56) References Cited

U.S. PATENT DOCUMENTS

| | | | |
|---|---|---|---|
| 2008/0049777 A1* | 2/2008 | Morrill | H04L 41/0896 370/420 |
| 2008/0084819 A1* | 4/2008 | Parizhsky | H04L 47/10 370/230 |
| 2008/0201468 A1* | 8/2008 | Titus | 709/224 |
| 2009/0005041 A1* | 1/2009 | Steinberg et al. | 455/435.2 |
| 2009/0073876 A1* | 3/2009 | Kimmich | H04L 1/0003 370/229 |
| 2009/0088169 A1* | 4/2009 | Aaron | 455/445 |
| 2009/0238074 A1* | 9/2009 | Vasseur | H04L 45/02 370/237 |
| 2010/0039936 A1* | 2/2010 | Jin et al. | 370/230 |
| 2010/0246480 A1* | 9/2010 | Aggarwal et al. | 370/328 |
| 2010/0248643 A1* | 9/2010 | Aaron et al. | 455/68 |
| 2010/0296483 A1* | 11/2010 | Sayeedi et al. | 370/331 |
| 2010/0306059 A1* | 12/2010 | Rettig et al. | 705/14.58 |
| 2010/0312892 A1* | 12/2010 | Woundy | H04L 41/0893 709/226 |
| 2011/0026523 A1* | 2/2011 | Charzinksi | H04L 45/00 370/392 |
| 2011/0087765 A1* | 4/2011 | Musgrave | H04L 41/0896 709/224 |
| 2011/0096675 A1* | 4/2011 | Li et al. | 370/252 |
| 2011/0096732 A1* | 4/2011 | Rashid et al. | 370/329 |
| 2011/0319071 A1* | 12/2011 | Beppler et al. | 455/424 |
| 2012/0026865 A1* | 2/2012 | Fan et al. | 370/225 |
| 2012/0039166 A1* | 2/2012 | Gao | H04W 24/02 370/221 |
| 2012/0155298 A1* | 6/2012 | Yang | H04W 24/08 370/252 |
| 2012/0177002 A1* | 7/2012 | Faucher et al. | 370/331 |
| 2012/0195204 A1* | 8/2012 | Patel et al. | 370/237 |
| 2012/0201252 A1* | 8/2012 | Subramanian | H04L 45/125 370/401 |
| 2012/0300754 A1* | 11/2012 | Rosenqvist | H04B 7/024 370/336 |
| 2013/0044591 A1* | 2/2013 | Song | H04L 45/50 370/228 |

* cited by examiner

PACKET ALLOCATION SCHEMA FOR 3G AND 4G ROUTERS

SUMMARY

A high-level overview of various aspects of the invention is provided here to introduce a selection of concepts that are further described in the detailed-description section below. This summary is not intended to identify key features or essential features of the claimed subject matter, nor is it intended to be used as an aid in isolation to determine the scope of the claimed subject matter. In brief and at a high level, this disclosure describes, among other things, a method of facilitating the transmission of data between two endpoints over multiple wireless links. An allocation server application and protocols facilitates the transmission of data in real-time between two endpoints using multiple wireless links over an information network. In one embodiment, an allocation server monitors the transmission of data between the modems on each end, and dynamically allocates packets of data across different links in order to reduce the overall delay in transmission, and minimize other adverse impacts on transmission quality.

BRIEF DESCRIPTION OF THE SEVERAL VIEWS OF THE DRAWINGS

Illustrative embodiments of the invention are described in detail below with reference to the attached drawing figures, wherein.

DETAILED DESCRIPTION

The subject matter of the present technology is described with specificity herein to meet statutory requirements. However, the description itself is not intended to define what we regard as our invention, which is what the claims do. The claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps disclosed herein, unless and except when the order of individual steps is explicitly described.

Embodiments of the invention provide systems, methods, and computer-readable media for facilitating the transmission of data over multiple wireless links using an allocation server. This may be especially useful for the real-time transmission of large amounts of data, such as a live video feed, which can be interrupted by delay, jitter, and/or dropped packets that are caused during a traditional wireless transmission. The allocation server may facilitate the transmission of data in real-time between two multiplexing devices and/or edge routers using multiple modems over an information network. The two multiplexing devices and/or edge routers may report their credentials to the allocation server, which monitors the transmission of data between multiple modems. The allocation server may dynamically direct and/or allocate packets of data across different wireless links based on the monitored data flow satisfying one or more thresholds in order to reduce the impact on the data stream by multipath delay, jitter, and dropped packets.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the invention. The following is a list of these acronyms:

3G Third-Generation Wireless Technology
4G Fourth-Generation Cellular Communication System
CD-ROM Compact Disk Read Only Memory
CDMA Code Division Multiple Access
GPRS General Packet Radio Service
GSM Global System for Mobile communications
DVD Digital Versatile Discs
EEPROM Electronically Erasable Programmable Read Only Memory
EVDO Evolution Data Optimized
IP Packets Internet Protocol Packets
LTE Long Term Evolution
OSI model Open Systems Interconnection model
RAM Random Access Memory
ROM Read Only Memory
SLA Service Level Agreement
TDMA Time Division Multiple Access
WLAN Wireless Local Area Network
BNC Base Network Controller
RNC Radio Network Controller
PDSN Packet Data Service Node
HA Home Agent Further, various technical terms are used throughout this description. An illustrative resource that fleshes out various aspects of these terms can be found in Newton's Telecom Dictionary by H. Newton, 25th Edition (2009).

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Accordingly, in one aspect, the present invention is directed to computer-readable media having computer-executable instructions embodied thereon that, when executed by a computing device, facilitate a method of allocating a transmission of data over multiple wireless links using an allocation server. The method comprises: receiving an indication of a first endpoint; receiving an indication of a second endpoint; receiving an indication of a plurality of wireless links between the first and second endpoints; monitoring data transmitted via the plurality of wireless links, wherein the data comprises a plurality of packets of data; and based on monitoring said data, allocating one or more of the plurality of packets of data.

In another aspect, embodiments of the present invention are directed to computer-readable media having computer-executable instructions embodied thereon that, when executed by a computing device, facilitate a method of allocating a transmission of data over multiple wireless links using an allocation server. The method comprises: receiving an indication of a first endpoint; receiving an indication of a second endpoint; receiving an indication of a plurality of wireless links between the first and second endpoints, wherein each of the plurality of wireless links comprises a data stream having a plurality of packets of data; monitoring each data stream, wherein said monitoring comprises receiving information regarding one or more of the following data stream characteristics: an amount of jitter between the first and second endpoints; an amount of packet loss between the first and second endpoints; and an amount of latency between the first and second endpoints; determining that at least one data stream characteristic satisfies a threshold, wherein at least one data stream characteristic that satisfies a threshold is associated with a transmission of a plurality of packets across a first wireless link; identifying a second wireless link; and allocating one or more of the plurality of packets of data from the first wireless link onto the second wireless link.

In yet another aspect, embodiments of the present invention are directed to a system for allocating a transmission of data over multiple wireless links. The system comprises: a first endpoint; a second endpoint; and an information network coupled to the first and second endpoints, wherein the information network comprises an allocation server that monitors one or more items of data transmitted across one or more of a plurality of wireless links between the first and second endpoints, wherein the allocation server allocates at least one of the one or more items of data, wherein allocating of at least one of the one or more items of data is based on one or more data stream characteristics.

Figure 1:
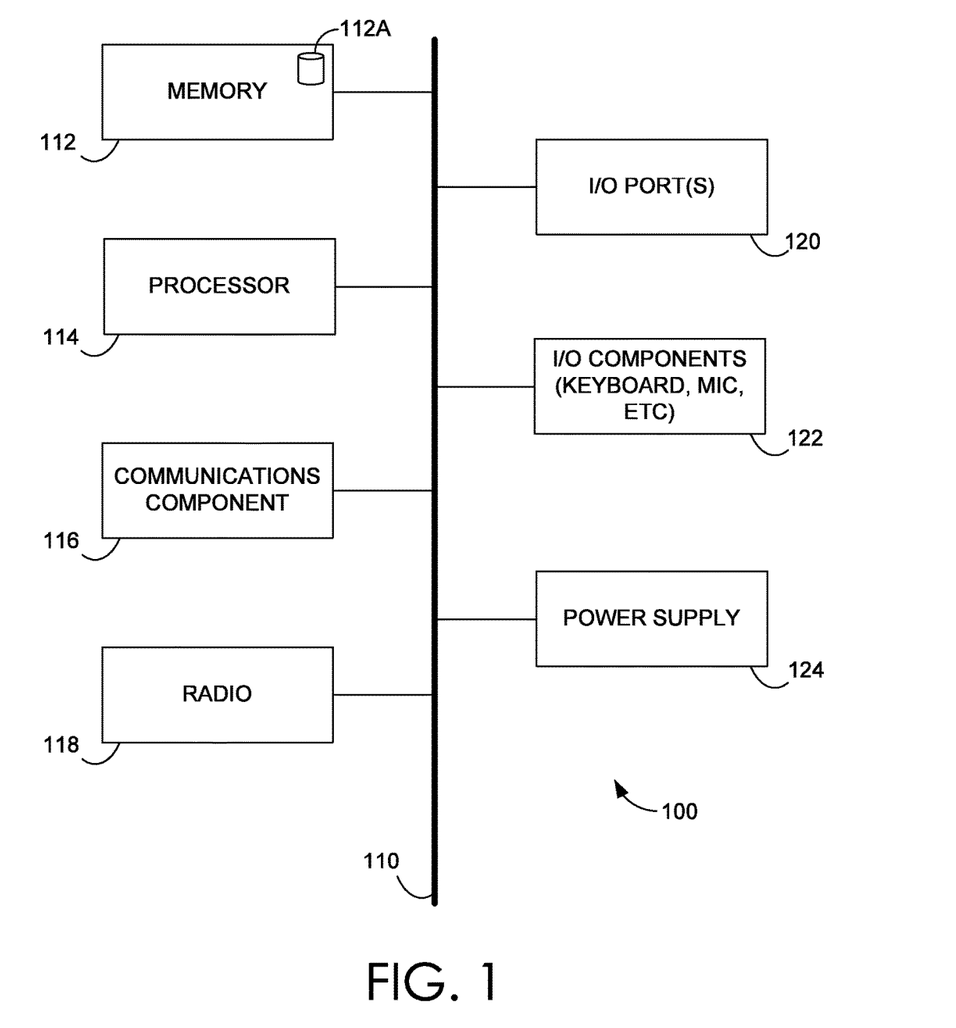
FIG. 1 depicts an exemplary computing device according to embodiments of the invention.

Referring to the drawings in general, and initially to FIG. 1 in particular, a block diagram of an illustrative wireless device according to one embodiment is provided and referenced generally by the numeral 100. Although some components are shown in the singular, they may be plural. For example, wireless device 100 might include multiple processors or multiple communications components, etc. As illustratively shown, wireless device 100 includes a bus 110 that directly or indirectly couples various components together including memory 112, a processor 114, a wireless communications component 116, a radio frequency component 118, input/output ports 120, I/O components 122, and a power supply 124. While we refer to the device as a wireless device, in some embodiments, the device may actually communicate across an information network with both wired and wireless components. For example, when a wireless device transmits data across a number of system components, such as a router, a modem, or a multiplexer, it may actually be a wired device, and thus additional components may be needed for a wired device. Both wireless and wired devices are contemplated to be within the scope of the present invention.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 112A that, when executed, facilitate various aspects disclosed herein. These embodied instructions will variously be referred to as "instructions" or an "application" for short. Processor 114 might actually be multiple processors that receive instructions 112A and process them accordingly.

The wireless communications component 116, in one embodiment, is a radio that facilitates communication with a wireless telecommunications network. Illustrative wireless telecommunications technologies include CDMA, GPRS, GSM, LTE, and the like. In some embodiments, the wireless communications component 116 might also facilitate other types of wireless communications including Wi-Fi communications and GIS communications and communications that utilize a WLAN. As can be appreciated, in various embodiments, wireless communications component 116 can be configured to support multiple technologies and/or multiple radios can be utilized to support multiple technologies. For example, a radio of a communications device can operate to support CDMA as well as LTE, for example, to transmit voice and data.

Radio frequency component 118 transmits signals of different frequencies and receives data from mobile devices that pick up on these signals. The power supplied to the radio frequency component 118 may dictate the range of the wireless device such that the greater the power, the larger the range where mobile devices may be detected.

Input/output port 120 might take on a variety of forms. Illustrative input/output ports include a USB jack, stereo jack, infrared port, proprietary communications ports, Ethernet interface, and the like. Input/output components 122 include items such as keyboards, microphones, speakers, touch screens, and any other item usable to directly or indirectly input data into wireless device 100. Power supply 124 includes items such as batteries, fuel cells, solar panels, or any other component that can act as a power source to wireless device 100.

Figure 2:
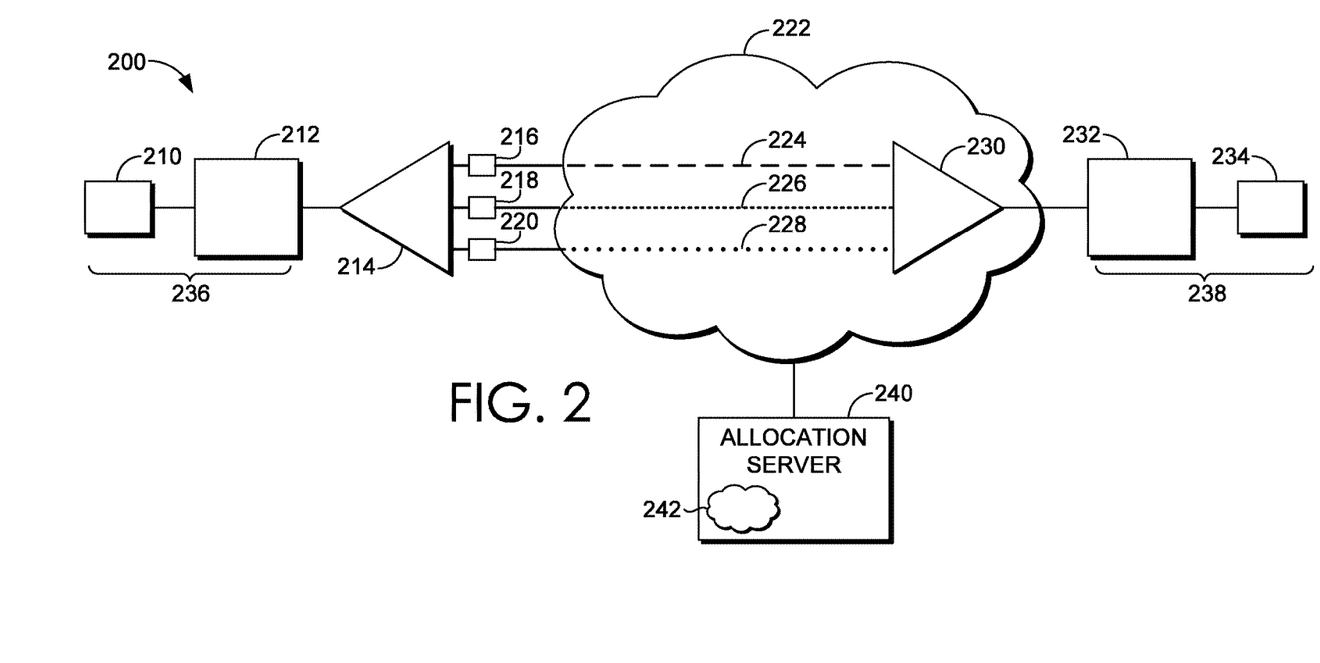
FIG. 2 depicts an illustrative system for transmitting data over multiple wireless links using an allocation server, according to an embodiment of the invention.

Turning now to FIG. 2, an exemplary network environment suitable for use in implementing embodiments of the present invention is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Embodiments of network environment 200 include a first device 210 that transmits data via a first router 212. First device 210 may be any type of device that generates or transmits data. For example, first device 210 may be a video camera device that generates data, such as packets of data, for transmission in network environment 200. Embodiments of the invention facilitate the real-time, wireless transmission of data from a first device 210. Although depicted as two separate components in FIG. 2, first device 210 and first router 212 may be referred to as a single entity, namely, a first endpoint 236. In some embodiments, first endpoint 236 performs the functions of both a first device 210 and a first router 212 in that data is directed from first endpoint 236 without needing a separate routing device. As such, first endpoint 236 may include a first device 210 that transmits data directly to a multiplexer 214. Accordingly, the term "first endpoint" 236 may be used to refer to a first device 210, a first router 212, or a combination of both. Additionally, the term "endpoint," with reference to a first or second end, may be used to generally refer to a local or remote device, or the beginning and ending point of data flow, without limitation to the type of devices at each end or the number of devices needed to facilitate data flow between the two endpoints.

Data from first endpoint 236 is directed across multiple data streams using multiplexer 214. Multiplexer 214 may also be referred to as a "mux." As previously discussed, in some embodiments, first device 210 may be coupled directly to multiplexer 214, without a separate first router 212. Accordingly, a first endpoint 236 may be coupled to a multiplexer 214 that divides streams of data across multiple wireless links.

In the example of FIG. 2, multiplexer 214 divides data transmitted from first endpoint 236 into multiple data streams using wireless modems 216, 218, and 220. Accordingly, wireless modems 216, 218, and 220 transmit data across information network 222. The term "wireless modem" refers to a modem that transmits data wirelessly and does not limit the modem itself from having both wired and wireless components. For example, a wireless modem may have a wired connection to multiplexer 214 while transmitting data wirelessly across information network 222. As FIG. 2 is only one exemplary embodiment of the invention, network environment 200 may include any number of wireless modems used to divide a stream of data from first endpoint 236. Additionally, any amount of packets of data may be transmitted via modems 216, 218, and 220. In other words, data generated by first device 210 need not be divided evenly among any particular number of wireless modems for transmission across information network 222.

In embodiments, each wireless modem coupled to multiplexer 214 transmits data across wireless links 224, 226, and 228 to multiplexer 230. For example, wireless modem 216 transmits data across wireless link 224 to multiplexer 230. However, it should be understood that wireless links 224, 226, and 228 do not imply a dedicated connection between modems wireless modems 216, 218, and 220, to multiplexer 230, but simply indicate the wireless transmission between two points. In other words, wireless links 224, 226, and 228 may include more than one path as data travels between two points, such as between multiplexer 214 and multiplexer 230. In further embodiments, wireless modems 216, 218, and 220 may transmit data directly to multiplexer 230, without the need for additional modems.

Information network 222 may be any type of wireless network that transmits data, and may utilize one or more types of wireless network technologies, such as 3G and/or 4G. By way of example only, and not limitation, information network 222 may utilize CDMA, GSM, and/or LTE technologies for wireless transmission of data. As will be understood by one skilled in the art, information network 222 may be associated with any number of wired and/or wireless components to transmit data across a wireless link between two endpoints. As such, information network 222 is not limited to only wireless components when transmitting data across one or more wireless links. Using information network 222, data is transmitted from wireless modems 216, 218, and 220 to multiplexer 230 across wireless links 224, 226, and 228. As will be understood, embodiments of the invention utilize any combination of multiple networks, such as wireless information network 222, including any combination of modems, wireless or wireline connections, different types of networks (e.g. LTE, CDMA, WiMAX, and LTE).

Information network 222 includes an allocation server 240, having an application 242. As will be discussed in detail below, allocation server 240 monitors the flow of data across wireless links 230, 232, and 234. In some embodiments, the number of IP packets and/or data packets transmitted across each of the wireless links 224, 226, and 228 varies according to a determination by allocation server 240. For example, execution of application 242 on allocation server 240 may direct packets of data from wireless link 230 to wireless link 232 based on satisfying a particular threshold. Accordingly, the terms "allocate," "direct," "redirect" or "allocating" may be used, in some embodiments, to refer to the movement of packets of data from one wireless link to another wireless link based on a satisfying one or more thresholds. In embodiments, a data may be intelligently allocated across a plurality of wireless links as a result of satisfying a threshold for data flow. Accordingly, embodiments of the invention include an allocation server that monitors the flow of data across multiple wireless links and determines which packets of data to transmit across which wireless links in light of the various factors affecting each wireless link (e.g. latency, jitter, and dropped packets). In another embodiment, one or more multiplexers may perform the functions of the allocation server, and determine which data items to transmit across which wireless links, using thresholds for each wireless link with respect to the jitter, latency, and dropped packets occurring on each link. As such, an allocation server 240 may exist within one or both of the multiplexers (the multiplexer and multiplexer) of the network environment 200, and one or both of the multiplexers may perform the function of monitoring the flow of data across multiple wireless links and determining which packets of data to transmit across which wireless links, in light of the various factors affecting each wireless link.

Multiplexer 230 receives data from wireless links 224, 226, and 228, and directs the data via second router 232 to second device 234. Second device 234 and second router 232 may be referred to as a single entity, namely, a second endpoint 238. In some embodiments, second endpoint 238 performs the functions of a second device 234 and a second router 232. In other embodiments, second endpoint 238 includes a second device 234 that receives data directly from a multiplexer 230.

In some embodiments, second router 232 receives data from information network 222 (via multiplexer 230) in the original order as initially transmitted from first endpoint 236, and prepares the data for presentation to second device 234. Second device 234 may be any device for receiving and/or displaying data. For example, second device 234 may be a monitor that displays data transmitted from first device 210. In the example where first device 210 is a video camera transmitting video data using multiple wireless links, second router 232 acts as a receiving router that reassembles the packets of data transmitted across information network 222 into the correct order.

Streams including multiple packets of data are transmitted from first endpoint 236 across multiple wireless links 224, 226, and 228 in information network 222. As part of the direction across multiple wireless links, packets from each of those streams of data may be allocated and/or distributed among one or more wireless links, and the original order of the data packets from first endpoint 236 may become altered during wireless transmission. Accordingly, packets of data arriving at multiplexer 230 and second router 232 may be re-arranged into the original order as initially transmitted from first endpoint 236, prior to presentation by second device 234. As such, data is wirelessly transmitted from first endpoint 236 to second endpoint 238 across multiple wireless links in information network 222, while being directed by allocation server 240. In embodiments, multiplexer 230 receives data directly from wireless links 224, 226, and 228, and re-sequences the packets into the original order as transmitted from first endpoint 236.

Returning now to the monitoring of data flow by allocation server 240, a number of variables may impact the quality of a wireless transmission across multiple wireless links between first and second endpoints 236 and 238. For example, signal strength, signal-to-noise ratio, the amount of noise affecting a signal, the type of modem, the number of devices logged onto the tower, atmospheric conditions (including temperature, humidity, and sun changes), materials between the wireless device and the modem and/or between an antenna and a tower, the amount of backhaul load from an antenna into a tower, signaling capacity, subscribers attached to the network, towers and various paths of towers associated with a transmission, and a variety of additional variables can all impact the quality of a wireless transmission. Such variables may affect the overall increase/decrease in dropped packets, increase/decrease in jitter, and/or increase/decrease in latency between packets. Accordingly, the amount of latency, jitter, and packet loss for a transmission across multiple links can be varied and unpredictable.

Latency generally refers to the amount of time delay between the time a packet is sent by the sender and when the same packet is received at the far end of a communication path, while jitter refers to the variation in the interval between packets compared to a constant value. Latency may also occur due to the speed of light, serialization (the amount of time a packet takes to get from one interface on an element, such as a router, to another interface on the same element, such as from a T1 interface to an Ethernet interface), and the speed of electrons across copper wire. With jitter, a resultant transmission of video data, for example, can be full of artifacts, drop-outs, and, thus, an unacceptable viewing experience. According to the present invention, transmission of data within information network 222 is optimized by allocation server 240 in light of variable latency, variable jitter, and variable packet loss.

Data is divided by multiplexer 214 across multiple wireless links 224, 226, and 228, in information network 222. In embodiments, in order to decrease the impact caused by the amount of delay, jitter, and packet loss for a transmission across multiple links, allocation server 240 allocates packets of data across one or more wireless links in information network 222, such as wireless links 224, 226, and 228. For example, packets of data allocated to wireless link 224 may be reallocated to transmit across wireless link 226 based on satisfying one or more thresholds for the data transmitted across each wireless link. In one embodiment, allocation server 240 monitors the stream of data flowing across multiple wireless links in information network 222 in order to determine where to allocate one or more data packets. In further embodiments, allocation server 240 monitors the flow of data across wireless links 224, 226, and 228 via one or more signaling channels.

Data is directed by allocation server 240 based on satisfying a predetermined threshold for data flow. Accordingly, such thresholds may be characterized by the type of data being monitored, the speed with which streams of data should be flowing across wireless links, the number of packets permitted for optimization of a particular variable (latency, jitter, dropped packets, etc.). In one embodiment, when the flow of traffic slows on wireless link 224 such that the overall delay of the transmission from the first device 210 satisfies a particular threshold, then a number of packets of data may be allocated by allocation server 240 from wireless link 224 onto wireless link 226. In other words, due to satisfying a threshold for latency between wireless modem 216 and multiplexer 230, one or more data items may be allocated to flow between wireless modems 218 and multiplexer 230. In one embodiment, allocation server 240 controls the allocation of packets of data via multiplexer 214, as associated with first endpoint 236.

In one example, the data flow across various wireless links may vary based on the unidirectional flow of one or more data streams. Accordingly, the corresponding threshold for a particular wireless link may vary based on the direction of data flow. For example, there may be one set of upstream thresholds for data travelling from wireless modem 216 to multiplexer 230, and a separate set of downstream thresholds for data travelling from multiplexer 230 to wireless modem 216. In embodiments, an upstream data flow refers to the flow of traffic across the wireless network from a local device to a remote destination. In further embodiments, a downstream data flow refers to the flow of traffic across the wireless network from a remote destination to a local device. As such, embodiments of the invention may adjust to accommodate the asymmetrical data flow between two endpoints. In one example, allocation server 240 may allocate data based on latency, jitter, dropped packets, upstream data flow characteristics, and/or downstream data flow characteristics, as it pertains to the corresponding thresholds for each. Further, due to the asymmetrical nature of the flow of data across the wireless network in both upstream and downstream directions, a threshold for one characteristic (such as a latency threshold) may be different for different modems, and for different directions of data flow (upstream or downstream).

In another example, wireless links 224, 226, and 228 have different capabilities for the transmission of data in a wireless environment, such as wireless information network 222. For example, if link 224 has an 800 kB capacity, link 226 has a 500 kB capacity, and link 228 has a 1.2 MB capacity at a given point in time, the characteristics of data transmitted across each link will vary, such as the amount of latency, jitter, and dropped packets. As such, each wireless link associated with wireless information network 222 may have a different corresponding threshold. Allocation of data flow by allocation server 240 may also be impacted by the amount of data that needs to be transmitted from first endpoint 236 to second endpoint 238, as well as the amount of variables that need to be decreased and/or optimized.

Accordingly, application 242 may be utilized by allocation server 240 to allocate the flow of data across multiple wireless links, based at least on the variables described above. For example, with data flowing from first device 210 being distributed across multiple wireless links by multiplexer 214 and received by multiplexer 230, information regarding performance characteristics from multiplexer 230 may be used by allocation server 240 to allocate data between one or more wireless links. For example, multiplexer 230 may provide an indication of data flow to allocation server 240 such that one or more thresholds associated with allocation server 240 are satisfied. In satisfying such thresholds, a determination may be made to reallocate one or more packets of data, such as speeding up or slowing down data, or moving data from one wireless link to another wireless link.

In another embodiment, because the functions of the allocation server may be performed by one or both of multiplexer 214 and multiplexer 230, allocation across multiple wireless links in information network 222 may occur automatically based on processing of data by multiplexer 214 and/or multiplexer 230. As will be understood, in some embodiments, the allocation of data flow across the wireless links by allocation server 240 is performed by the multiplexer 214 and multiplexer 230. Accordingly, the functions of the allocation server 240, as performed by multiplexer 214 and multiplexer 230, include the monitoring of data flow between two endpoints, and the analysis of such data flow to determine the best path across multiple wireless links for the data.

In one embodiment, an SLA may be established based on the criteria used and/or thresholds associated with allocation server 240. For example, the directing of data by allocation server 240 may result in a higher-quality transmission from endpoint to endpoint, depending on the data (whether "mission critical" or not, or whether the data being transmitted is time-sensitive). Additionally, allocation of data by allocation server 240 may enable a more accurate measure of the quality of service in a wireless environment such as information network 222, and may maximize network up time, as the network monitoring by allocation server 240 aids in the management of network communication. Such results of allocation of real-time transmissions across multiple wireless links may provide consistently measurable performance as part of an SLA.

Embodiments of the present invention operate in a serial environment, where data from a first endpoint is transmitted to a second endpoint. Further embodiments of the invention refer to a broadcast environment that transmits a signal from first device 210 to a plurality of second devices 240. Additionally, embodiments of the present invention optimize one or more layers of the OSI Model. For example, allocation server 240 may have thresholds for data flow that optimize data transport using multiple links (such as wireless links 230,232, and 234), the flow of data during a particular session, the presentation of data, and an application. Accordingly, allocation server 240 may optimize the flow of multiple streams of wireless data, using multiple wireless links, and may also incorporate a data rate developer that slows down or speeds up particular modems that may be causing a delay in the overall transmission of the data streamed across multiple links. Further embodiments of the invention include a remote control allocation of data transmission via allocation server 240, such as remotely adjusting the speeds of data transmission across wireless links 224, 226, and 228.

Figure 3:
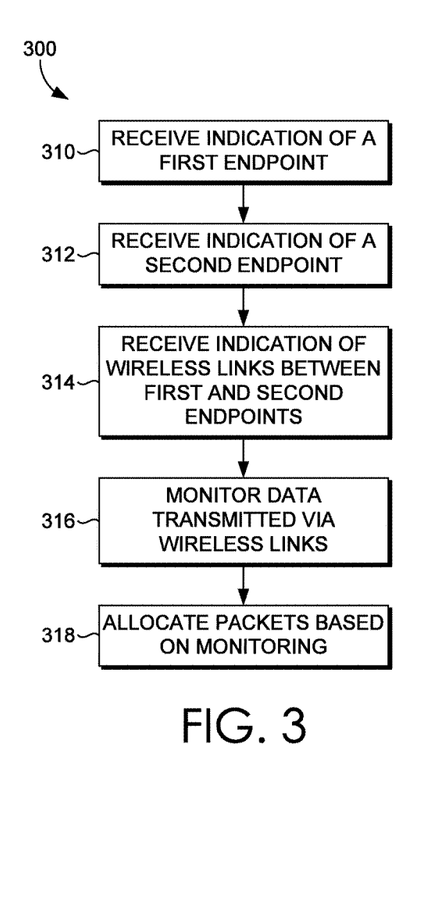
FIG. 3 depicts an illustrative method of transmitting data over multiple wireless links using an allocation server, according to an embodiment of the invention.

Referring next to FIG. 3, an exemplary flow diagram 300 depicts a method of transmitting data over multiple wireless links using an allocation server. At block 310, an indication of a first endpoint is received. At block 312, an indication of a second endpoint is received. For example, allocation server 240 may receive an indication of a first endpoint 236 and an indication of a second endpoint 238. At block 314, an indication of wireless links between the first and second endpoints is received. Data transmitted via the wireless links is monitored at block 316, and based on such monitoring, one or more packets are allocated at block 318. For example, allocation server 240 may receive an indication of a plurality of wireless links between two endpoints, and monitor the flow of traffic accordingly.

Figure 4:
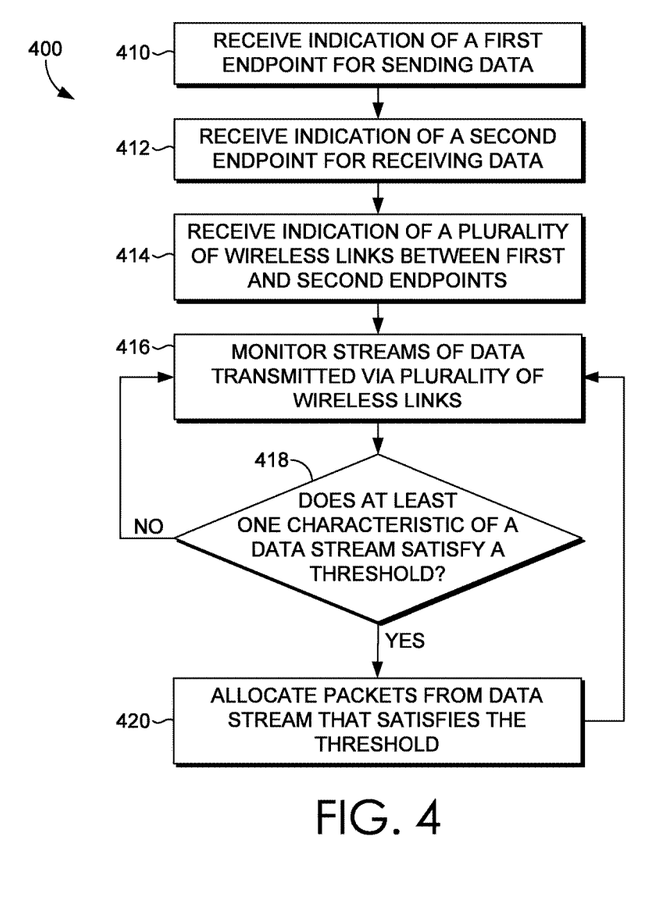
FIG. 4 depicts an illustrative method of transmitting data over multiple wireless links using an allocation server, according to an embodiment of the invention.

Turning next to FIG. 4, an exemplary flow diagram 400 depicts a method of transmitting data over multiple wireless links using an allocation server. Indications of a first and second endpoint are received at block 410 and 412. At block 414, an indication of a plurality of wireless links between first and second endpoints is received. At block 416, streams of data transmitted via the plurality of wireless links is monitored. For example, allocation server 240 may monitor streams of data across a plurality of wireless links between two endpoints. A determination is made at block 418 regarding whether at least one characteristic of a data stream satisfies a threshold. For example, it may be determined that one data stream between the first and second endpoints satisfies a particular threshold value for an amount of latency, and as a result, one or more packets of data from the data stream may need to be allocated across a different wireless link. Accordingly, at block 420, one or more packets from the data stream that satisfy the threshold are allocated to a different wireless link, at block 420. If it is determined that no characteristics of the data stream satisfy the threshold, at block 418, then the method may return to the monitoring of block 416.

Figure 5:
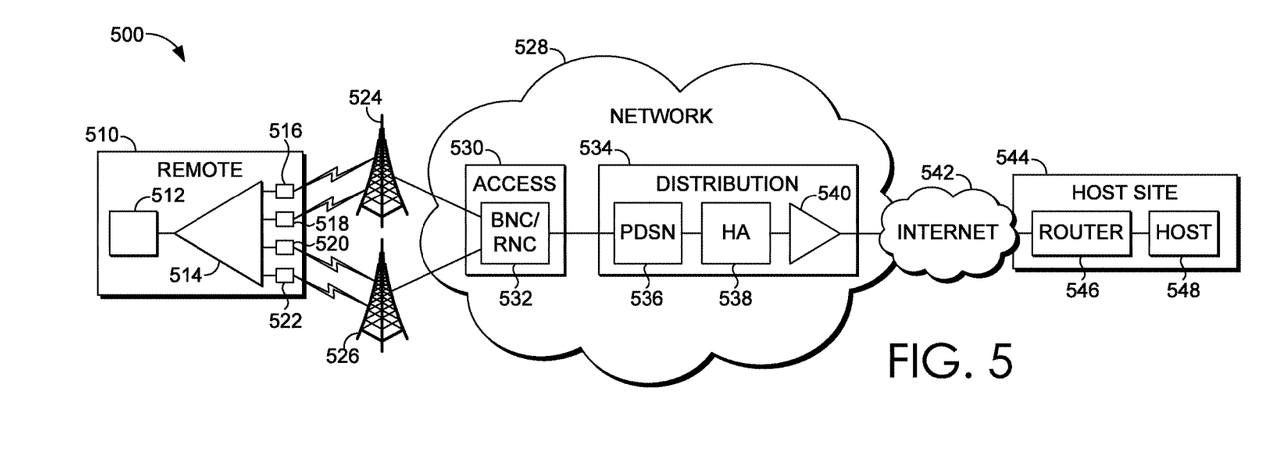
FIG. 5 depicts an illustrative system for transmitting data over multiple wireless links using an allocation server, according to an embodiment of the invention.

Referring next to FIG. 5, an exemplary network environment suitable for use in implementing embodiments of the present invention is illustrated and designated generally as network environment 500. Network environment 500 is but one example of a suitable network environment and is not intended to suggest any limitation as to the scope of use or functionality of the invention. Neither should the network environment be interpreted as having any dependency or requirement relating to any one or combination of components illustrated.

Embodiments of network environment 500 include a remote site 510, a source 512, a multiplexer 514, a plurality of modems 516, 518, 520, and 522, receiving components 524 and 526, wireless network 528, access device 530, controller 532, distribution device 534, node 536, agent 538, multiplexer 540, internet 542, host site 544, router 546, and host 548. In embodiments, data from remote site 510 is transmitted across multiple wireless links in wireless network 528, to host 548. As described above, multiplexer 514 may transmit data across the plurality of modems 516, 518, 520, and 522 such that the transmission is optimized in light of latency, jitter and dropped packets. As will be understood, network environment 500 may include any number of elements that provide the same functionality described in the example of FIG. 5. Accordingly, there may be any number of modems that facilitate the transmission of data across multiple wireless links in wireless network 528.

Receiving components 524 and 526 are base stations or any other device that facilitates communication between a remote site 510 and a wireless network 528. In the example of FIG. 5, data from source 512 is transmitted via multiplexer 514. Source 512 may be any type of device that generates or transmits data. For example, source 512 may be a video camera device that generates data, such as packets of data, for transmission in a wireless network 528.

In the example of FIG. 5, multiplexer 514 divides data transmitted from source 512 into multiple data streams using wireless modems 516, 518, 520, and 522. As FIG. 5 is only one exemplary embodiment of the invention, wireless network 528 may include any number of devices to transmit data across a plurality of wireless links. For example, wireless network may include an access device 530 and a distribution device 534, as two of several elements within the network 528. Additionally, as will be understood, the network 528 and internet 542 may be combined into a single unit that wirelessly transmits data.

Access device 530 includes a controller 532. Also within the wireless network 528 is a distribution device 534, which may include a node 536, an agent 538, and a multiplexer 540. As discussed above, multiplexer 540 may receive multiple streams of data transmitted across wireless network 528. In embodiments, multiplexer 514 and multiplexer 540 perform the functions, either alone or in combination, of an allocation server. As such, in one embodiment, multiplexer 514 and multiplexer 540 monitor the flow of data across multiple wireless links between the source 512 and the host 548, determine whether one or more thresholds have been satisfied, and route and/or direct data accordingly. In further embodiments, multiplexer 540 receives multiple streams of data transmitted across multiple wireless links, and organizes the data into the original order as initially transmitted form source 512.

In embodiments, data is transmitted to host site 544 across a plurality of wireless links via wireless network 528 and internet 542. Host site 544 may include a router 546 that receives the incoming data stream, and a host 548, which is the intended recipient of the data transmitted from source 512.

Figure 6:
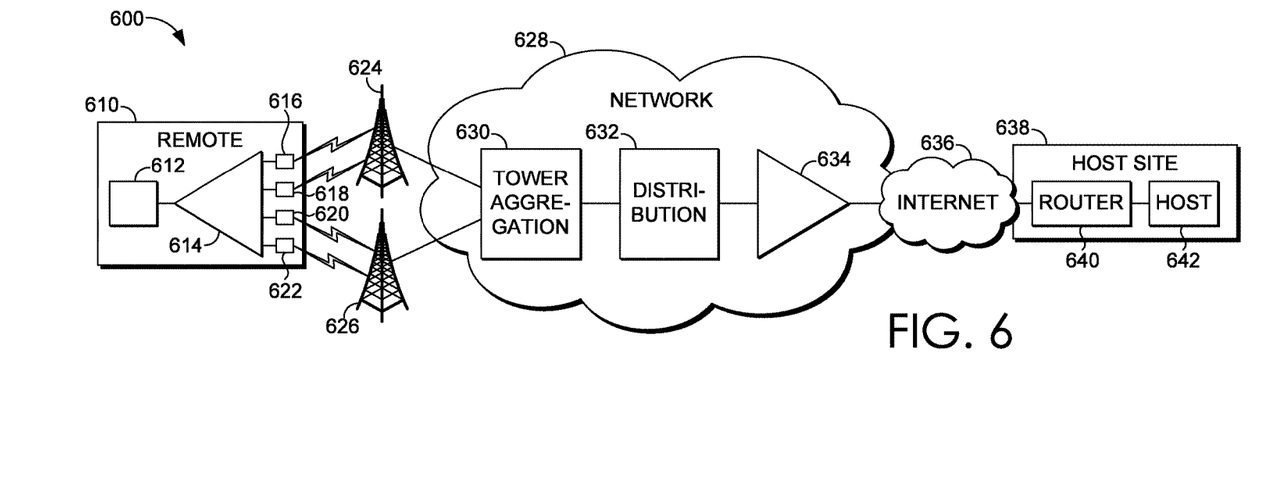
FIG. 6 depicts an exemplary network environment suitable for use in implementing embodiments of the present invention.

Referring finally to FIG. 6, an exemplary network environment suitable for use in implementing embodiments of the present invention is illustrated and designated generally as network environment 600. Network environment 600 is but one example of a suitable network environment and is not intended to suggest any limitation as to the scope of use or functionality of the invention. Neither should the network environment be interpreted as having any dependency or requirement relating to any one or combination of components illustrated.

Embodiments of network environment 600 include a remote site 610, a source 612, a multiplexer 614, a plurality of modems 616, 618, 620, and 622, receiving components 624 and 626, wireless network 628, tower aggregation component 630, distribution component 632, multiplexer 634, internet 636, host site 638, router 640, and host 642. In embodiments, data from remote site 610 is transmitted across multiple wireless links in wireless network 628, to host 638. As described above, multiplexer 614 may transmit data across the plurality of modems 616, 618, 620, and 622, such that the transmission is optimized in light of latency, jitter and dropped packets. As will be understood, network environment 600 may include any number of elements that provide the same functionality described in the example of FIG. 6. Accordingly, there may be any number of modems that facilitate the transmission of data across multiple wireless links in wireless network 628.

Receiving components 624 and 626 may be base stations or any other device that facilitates communication between a remote site 610 and a wireless network 628. In the example of FIG. 6, data from source 612 is transmitted via multiplexer 614. Source 612 may be any type of device that generates or transmits data. For example, source 612 may be a video camera device that generates data, such as packets of data, for transmission in a wireless network 628.

In the example of FIG. 6, multiplexer 614 divides data transmitted from source 612 into multiple data streams using wireless modems 616, 618, 620, and 622. As FIG. 6 is only one exemplary embodiment of the invention, wireless network 628 may include any number of devices to transmit data across a plurality of wireless links. For example, wireless network may include a tower aggregation component 620 and a distribution component 632, as two of several elements within the wireless network 628. In further embodiments, tower aggregation component 630 may transmit data within wireless network 628 without the need for an additional distribution component 632, and may transmit data directly or indirectly to multiplexer 634. As such, embodiments of network environment 600 include a plurality of additional devices that facilitate the transmission of data between the tower aggregation component 620 and the distribution component 632. Additionally, as will be understood, the wireless network 628 and internet 636 may be combined into a single unit that wirelessly transmits data, as the internet 636 may be incorporated into wireless network 628.

In some embodiments, tower aggregation component 630 includes a controller, such as a BNC and/or RNC device. Further embodiments of wireless network 628 may include a distribution component 632, which incorporates or is separate from multiplexer 634. As discussed above, multiplexer 634 may receive multiple streams of data transmitted across wireless network 628. In embodiments, multiplexer 614 and multiplexer 634 perform the functions, either alone or in combination, of an allocation server. As such, in one embodiment, multiplexer 614 and/or multiplexer 634 monitor the flow of data across multiple wireless links between the source 612 and the host 642, determine whether one or more thresholds have been satisfied, and allocate and/or direct data accordingly. In further embodiments, multiplexer 634 receives multiple streams of data transmitted across multiple wireless links, and organizes the data into the original order as initially transmitted form source 612.

In embodiments, data is transmitted to host site 642 across a plurality of wireless links via wireless network 628 and internet 636. Host site 638 may include a router 640 that receives the incoming data stream, and a host 642, which is the intended recipient of the data transmitted from source 612.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

We claim:

1. One or more non-transitory computer-readable media having computer-executable instructions embodied thereon that, when executed by a computing device, perform a method of directing transmission of data comprising a plurality of data packets over a plurality of wireless links using an allocation server, the method comprising:
    receiving an indication of a first endpoint;
    receiving an indication of a second endpoint;
    receiving an indication from each of a plurality of wireless links communicatively coupling the first and second endpoints, wherein the plurality of wireless links includes a first wireless link and a second wireless link;
    monitoring data, by an allocation server, transmitted via each of the plurality of wireless links between the first and second endpoints, wherein monitoring data further comprises monitoring one or more of the following:
an amount of jitter between the first and second endpoints,
an amount of packet loss between the first and second endpoints,
or
an amount of latency between the first and second endpoints;
based on monitoring the data, dividing, at a first multiplexer, the plurality of data packets between more than one of the plurality of wireless links by directing a first portion of the plurality of data packets to a first wireless link and a second portion of the plurality of data packets to a second wireless link as instructed by the allocation server, wherein an initial sequence of the plurality of data packets for transmission between the first and second endpoints is altered by the dividing; and
at a second multiplexer, reordering the plurality of data packets to the initial sequence prior to delivery to the first endpoint or the second endpoint.

2. The media of claim 1, further comprising:
determining, by the allocation server, that the amount of jitter satisfies a threshold, wherein the amount of jitter that satisfies the threshold is associated with a transmission of data packets across the first wireless link;
identifying the second wireless link; and
determining an amount of data packets of the first wireless link to direct, via the first multiplexer, onto the second wireless link to reduce the impact of jitter between the first and second endpoints, wherein the amount of data packets is the first portion.

3. The media of claim 1, further comprising:
determining, by the allocation server, that the amount of packet loss satisfies a threshold, wherein the amount of packet loss that satisfies the threshold is associated with a transmission of data packets across the first wireless link;
identifying the second wireless link; and
determining an amount of data packets of the first wireless link to direct, via the first multiplexer, onto the second wireless link to reduce the impact of packet between the first and second endpoints, wherein the amount of data packets is the first portion of the plurality of data packets.

4. The media of claim 1, wherein dividing the plurality of data packets comprises:
determining, by the allocation server, that the amount of latency satisfies a threshold, wherein the amount of latency that satisfies the threshold is associated with a transmission of data packets across the first wireless link;
identifying the second wireless link; and
determining an amount of data packets of the first wireless link to direct, via the first multiplexer, onto the second wireless link, wherein the amount of data packets is the first portion of the plurality of data packets.

5. One or more non-transitory computer-readable media having computer-executable instructions embodied thereon that, when executed by a computing device, perform a method of directing a transmission of data comprising a plurality of data packets over a plurality of transmission links using an allocation server, the method comprising:
receiving an indication of a first endpoint;
receiving an indication of a second endpoint;
receiving an indication from each of the plurality of transmission links communicatively coupling the first and second endpoints, wherein each of the plurality of transmission links comprise a data stream adapted to transmit data between the first and second endpoints;
monitoring, at an allocation server, each of the plurality of data streams, wherein the monitoring comprises receiving information regarding one or more of the following data stream characteristics for each of the plurality of data streams:
(1) an amount of jitter between the first and second endpoints;
(2) an amount of packet loss between the first and second endpoints; and
(3) an amount of latency between the first and second endpoints;
determining that at least one data stream characteristic associated with a first data stream of a first transmission link satisfies a threshold;
determining that at least one data stream characteristic associated with a second data stream of a second transmission link does not satisfy the threshold;
dividing, at a first multiplexer instructed by the allocation server, the second data stream into at least a first portion and a second portion of data packets;
directing the first portion of data packets from the second transmission link to the first transmission link, wherein an initial sequence of data packets of the second data stream is altered by the directing; and
reordering, at a second multiplexer, data packets of the second data stream to the initial sequence prior to delivery to the first endpoint or the second endpoint.

6. The media of claim 5, further comprising determining that none of the data stream characteristics associated with the second transmission link satisfy one or more predetermined thresholds.

7. The media of claim 5, wherein directing the first portion of data packets is based on reducing the impact of at least one of the data stream characteristics that satisfies a threshold.

8. The media of claim 5, further comprising transmitting the first portion and the second portion across at least one of the plurality of transmission links via the first multiplexer.

9. The media of claim 8, further comprising receiving, at a second endpoint and subsequent to reordering at the second multiplexer, each of the first and second portions of data packets.

10. The media of claim 5, wherein directing the first portion of data packets to the first transmission link is performed by the first multiplexer based on instructions by the allocation server.

11. A system for directing a transmission of data comprising a plurality of data packets via a plurality of wireless links, the system comprising:
a first endpoint;
a second endpoint;
a first and second wireless link, each comprising a plurality of transmission characteristics and communicatively coupling the first endpoint to the second endpoint;
an allocation server adapted to:
monitor data transmitted between the first and second endpoints via the first and second wireless links, wherein the data monitored includes transmission characteristics of the first and second wireless links and wherein the transmission characteristics comprise at least one of the following:

an amount of jitter between the first and second endpoints;

an amount of packet loss between the first and second endpoints; and an amount of latency between the first and second endpoints;

a first multiplexer adapted to:

direct, as instructed by the allocation server when monitoring data, a portion of data packets from the first wireless link to the second wireless link based at least one of the plurality of transmission characteristics, wherein an initial transmission order of the data packets is changed by directing the portion of data packets from the first wireless link to the second wireless link;

a second multiplexer adapted to:

reorder the data packets into the initial transmission order prior to delivery of the data packets to the first or second endpoint; and an information network coupled to the allocation server and intervening between the first and second endpoints.

12. The system of claim 11, wherein the allocation server comprises non-transitory, computer-readable media embodied with a data structure that includes one or more predetermined thresholds for determining whether to direct a portion of data packets from the first wireless link to the second wireless link.

13. The system of claim 11, wherein the allocation server is adapted to:

determine that at least one of the transmission characteristics associated with the first wireless link satisfies at least one of the one or more predetermined thresholds; and identify the second wireless link;

direct, via the first multiplexer, the first portion data packets to the first wireless link based, in part, on the determination that at least one of the transmission characteristics associated with the first wireless link satisfied at least one of the transmission characteristics.

14. The system of claim 13, wherein the allocation server adapted to identify the second wireless link is further adapted to determine-that none of the transmission characteristics associated with the second wireless link satisfy at least one of the predetermined thresholds.

15. The system of claim 11, wherein the first endpoint is a first router and the second endpoint is a second router.

16. The system of claim 15, wherein the information network further comprises at least one of the first or second multiplexers, and wherein at least one of the first or second multiplexers comprises the allocation server.

* * * * *